(12) United States Patent
Adachi (10) Patent No.: US 9,127,586 B2
(45) Date of Patent: Sep. 8, 2015

(54) APPARATUS FOR ESTIMATING EXHAUST GAS TEMPERATURE OF INTERNAL COMBUSTION ENGINE

(71) Applicant: Hino Motors, Ltd., Hino-shi (JP)

(72) Inventor: Yusuke Adachi, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 14/127,056

(22) PCT Filed: Jul. 4, 2013

(86) PCT No.: PCT/JP2013/068388
§ 371 (c)(1),
(2) Date: Dec. 17, 2013

(87) PCT Pub. No.: WO2014/038278
PCT Pub. Date: Mar. 13, 2014

(65) Prior Publication Data
US 2015/0032390 A1    Jan. 29, 2015

(30) Foreign Application Priority Data

Sep. 4, 2012  (JP) .................. 2012-194366

(51) Int. Cl.
*F01N 11/00* (2006.01)
*G01M 15/10* (2006.01)
(Continued)

(52) U.S. Cl.
CPC .......... *F01N 11/005* (2013.01); *F02D 41/1447* (2013.01); *F02D 41/1448* (2013.01);
(Continued)

(58) Field of Classification Search
CPC ..... F01N 11/002; F01N 11/005; G01K 13/02; G01K 2013/024; G01M 15/102; G01M 15/106
USPC ............ 702/50, 130, 133–136; 700/299, 274; 123/676
See application file for complete search history.

(56) References Cited

U.S. PATENT DOCUMENTS 6,067,800 A    5/2000   Kolmanovsky et al.
6,256,992 B1   7/2001   Lewis, Jr. et al.
(Continued)

FOREIGN PATENT DOCUMENTS

CN    101622437 A    1/2010
CN    101685044 A    3/2010
(Continued)

OTHER PUBLICATIONS

Office Action issued Sep. 17, 2013, in Japanese Patent Application No. 2012-194366, filed Sep. 4, 2012.
(Continued)

*Primary Examiner* — Manuel L Barbee
(74) *Attorney, Agent, or Firm* — Oblon, McClelland, Maier & Neustadt, L.L.P.

(57) ABSTRACT

An apparatus for estimating a temperature of an exhaust gas which is exhausted from an internal combustion engine to an exhaust manifold. The apparatus estimates the temperature of the exhaust gas in the exhaust manifold, based on a temperature increment caused by an adiabatic compression until a gas introduced in an intake manifold is exhausted to the exhaust manifold, and a temperature increment obtained by dividing the amount of heat lost in the exhaust gas among the amount of heat introduced into cylinders by the diluted gas flow of the exhaust gas in the exhaust manifold.

5 Claims, 3 Drawing Sheets (51) Int. Cl.
  *G01K 13/02* (2006.01)
  *F02D 41/14* (2006.01)
(52) U.S. Cl.
  CPC ............ *G01K13/02* (2013.01); *G01M 15/102* (2013.01); *F02D 2200/0406* (2013.01); *F02D 2200/0414* (2013.01); *F02D 2200/0614* (2013.01); *F02D 2200/0616* (2013.01)

(56) References Cited

U.S. PATENT DOCUMENTS

| 6,550,464 | B1 | 4/2003 | Brackney | |
| 2012/0203445 | A1* | 8/2012 | Kachi et al. | 701/104 |

FOREIGN PATENT DOCUMENTS

| EP | 1 798 403 A1 | 6/2007 |
| JP | 10 26049 | 1/1998 |
| JP | 2003 307151 | 10/2003 |
| JP | 2004 197716 | 7/2004 |
| JP | 2010 101259 | 5/2010 |
| JP | 2012 112326 | 6/2012 |
| JP | 2012-117503 | 6/2012 |

OTHER PUBLICATIONS

Written Opinion of the International Searching Authority Issued Jul. 30, 2013 in PCT/JP13/068388 Filed Jul. 4, 2013 (with English translation).
International Search Report Issued Jul. 30, 2013 in PCT/JP13/068388 Filed Jul. 4, 2013.
Extended European Search Report issued Aug. 28, 2014 in Patent Application No. 13801455.0.
Heywood J B, "Ideal Models of Engine Cycles", "Chapter 5" in Heywood J B, "Internal Combustion Engine Fundamentals", XP002728066, Jan. 1, 1988, pp. 161-173.
Written Opinion of the International Searching Authority Issued Jul. 30, 2013 in PCT/JP13/068388 filed Jul. 4, 2013 (with English Translation dated Mar. 19, 2015).
Office Action mailed Mar. 13, 2015, in Chinese Patent Application No. 201380001877.6.

* cited by examiner

APPARATUS FOR ESTIMATING EXHAUST GAS TEMPERATURE OF INTERNAL COMBUSTION ENGINE

TECHNICAL FIELD

The present invention relates to an exhaust gas temperature estimating apparatus for estimating an exhaust gas temperature in an exhaust manifold of an internal combustion engine.

BACKGROUND ART

In the case of performing an engine control or an exhaust gas purification control of a vehicle, in order to improve the accuracy of the control, it is important to exactly understand the property of each part of the engine. Particularly, an exhaust gas temperature in an exhaust manifold is very important. In the case of using a general thermistor type temperature sensor in order to detect the exhaust gas temperature, if the protruding amount of the sensor into the exhaust manifold increases (especially, the protruding amount of the sensor increases in the case of a large diesel engine having an exhaust manifold of a large diameter), there is a danger that the sensor may be broken by an engine vibration or an exhaust vibration. If the diameter of the sensor is increased as a countermeasure against the breakage, the sensor has a low responsiveness which is improper for the control. Therefore, there are technologies of estimating an exhaust gas temperature using detected values of sensors disposed at other locations of the engine without using the above-mentioned sensor. Patent Literature 1 discloses a technology of detecting an intra-cylinder pressure by an intra-cylinder pressure sensor installed at a cylinder of an engine and estimating the temperature of the exhaust gas side based on the detected value. Further, Patent Literature 2 discloses a technology of measuring the number of revolutions or a load of an engine, obtaining a standard exhaust gas temperature from an exhaust gas temperature map by using the measured values, and modifying the standard exhaust gas temperature by means of an atmospheric pressure and an intake temperature, so as to estimate the exhaust gas temperature.

CITATION LIST

Patent Literature

Patent Literature 1: Japanese Patent Laid-Open Publication No. 2004-197716
Patent Literature 2: Japanese Patent Laid-Open Publication No. 2003-307151

SUMMARY OF INVENTION

Technical Problem

In the case of an estimation method disclosed in Patent literature 1, an intra-cylinder pressure sensor is installed in a cylinder. However, it is general that the intra-cylinder pressure sensor is not used, and the intra-cylinder pressure sensor thus has a low reliability as a sensor. Further, in the case of an estimation process using the intra-cylinder pressure of the cylinder, a processing load is so high that the processing capability of an Electronic Control Unit (ECU) of a generally used engine is not enough for a real time processing. Further, the estimation method disclosed in the Patent Literature 2 corresponds to an estimation in a normal operation state and has lower estimation accuracy in a transient operation state. Particularly, in the case of a diesel engine, since an Exhaust Gas Recirculation (EGR) system or a variable capacitance type turbocharger is indispensably required in order to inhibit an exhaust gas, the estimation should have a sufficient accuracy even in a complicated system.

Accordingly, an aspect of the present invention is to provide an apparatus for estimating an exhaust gas temperature of an internal combustion engine, which can estimate the temperature of the exhaust gas in an exhaust manifold with a high accuracy and a low processing load, by using only a typical sensor installed in the internal combustion engine.

Solution to Problem

In accordance with an aspect of the present invention, there is provided an apparatus for estimating an exhaust gas temperature of an exhaust manifold in an internal combustion engine. The apparatus includes an estimating means for estimating the exhaust gas temperature, based on a temperature increment caused by an adiabatic compression until a gas introduced in an intake manifold is exhausted to the exhaust manifold in the internal combustion engine, and a temperature increment caused by an amount of heat obtained by dividing an amount of heat lost in an exhaust gas among an amount of heat introduced into cylinders of the internal combustion engine, by a diluted gas flow of the exhaust gas in the exhaust manifold.

In the apparatus for estimating the exhaust gas temperature, the estimating means estimates a temperature increment of an intake gas caused by an adiabatic compression in the internal combustion engine until the intake gas which is introduced in an intake manifold is exhausted to the exhaust manifold, and simultaneously estimates a temperature increment caused by an amount of heat obtained by dividing an amount of heat lost in the exhaust gas among an amount of heat introduced into the cylinders of the internal combustion engine, by a diluted gas flow of the exhaust manifold. Then, two temperature increments are added so as to estimate an exhaust gas temperature in the exhaust manifold. The gas introduced in the intake manifold is adiabatically compressed in the internal combustion engine, and exhausted to the exhaust manifold. Therefore, due to the adiabatic compression, the temperature of the gas when the gas is introduced in the intake manifold increases up to the temperature of the gas when the gas is exhausted to the exhaust manifold. The temperature of the gas after the adiabatic compression can be simply calculated by an equation of an adiabatic state by using the temperature or a pressure of the intake gas of the intake manifold and a pressure of an exhaust gas of the exhaust manifold. Further, fuel is introduced and combusted in the cylinders of the internal combustion engine, and the amount of heat (heat energy) caused by the combustion of the fuel is used to increase a temperature of cooling water or to reciprocate pistons, while the residual amount of heat is lost through the exhaust gas. The exhaust gas is exhausted to the exhaust manifold and diluted. Accordingly, the temperature of the exhaust gas in the exhaust manifold is increased by the amount of heat obtained by dividing the amount of heat lost in the exhaust gas by the amount of the diluted gas flow. The exhaust gas temperature increment caused by the amount of heat introduced in the cylinders can be simply calculated by using the amount of heat introduced in the cylinder (the amount of fuel), the amount of diluted gases in the exhaust manifold (the amount of the exhaust gas flow) and a loss rate of the amount of the heat lost in the exhaust gas among the amount of heat introduced in the cylinder. By adding two temperature increments, it is possible to estimate the temperature of the exhaust gas in the exhaust manifold at a high accuracy. With the exhaust gas temperature estimating apparatus in an internal combustion engine as described above, the exhaust gas temperature in the exhaust manifold can be estimated by using the temperature increment caused by the adiabatic compression and the temperature increment caused by the amount of heat/diluted gas flow lost in the exhaust gas among the amount of heat introduced into the cylinders. Therefore, the apparatus for estimating the exhaust gas temperature can estimate the exhaust gas temperature with a high accuracy and a low processing load by using only a general sensor installed in the internal combustion engine.

The apparatus for estimating a temperature of an exhaust gas of an internal combustion engine according to an aspect of the present invention includes an intake gas temperature acquiring means for acquiring an intake gas temperature in the intake manifold, an intake gas pressure acquiring means for acquiring an intake gas pressure in the intake manifold, an exhaust gas pressure acquiring means for acquiring an exhaust gas pressure in the exhaust manifold, an intake gas flow acquiring means for acquiring an intake gas flow which flows from the atmosphere, a fuel flow acquiring means for acquiring a fuel flow supplied into the cylinder, and an exhaust loss rate acquiring means for acquiring an exhaust loss rate, wherein the estimating means estimates a temperature increment, which is caused by the adiabatic compression until a gas introduced in the intake manifold is exhausted to the exhaust manifold, by using the intake gas temperature acquired by the intake gas temperature acquiring means, the intake gas pressure acquired by the intake gas pressure acquiring means, and the exhaust gas pressure acquired by the exhaust gas pressure acquiring means, and simultaneously estimates a temperature increment, which is caused by an amount of heat obtained by dividing an amount of heat lost in the exhaust gas among an amount of heat introduced into the cylinders of the internal combustion engine by an amount of the diluted gas flow of the exhaust gas in the exhaust manifold by using the intake gas flow acquired by the intake gas flow acquiring means, the fuel flow acquired by the fuel flow acquiring means, and the exhaust loss rate acquired by the exhaust loss rate acquiring means.

In the apparatus for estimating the exhaust gas temperature, the intake gas temperature acquiring means acquires the intake gas temperature in the intake manifold. The intake gas temperature acquiring means includes, for example, a conventional intake gas temperature sensor which is generally used. In the apparatus for estimating the exhaust gas temperature, the intake gas temperature acquiring means acquires the intake gas temperature in the intake manifold. The intake gas temperature acquiring means is a conventional intake gas pressure sensor (a boost pressure sensor in the case of an internal combustion engine equipped with a turbocharger) which is generally used. Further, in the apparatus for estimating the exhaust gas temperature, the exhaust gas pressure acquiring means acquires the exhaust gas pressure in the exhaust manifold. The exhaust gas pressure acquiring means includes, for example, a conventional exhaust gas pressure sensor which is generally used, or an estimating means using a well-known estimating method. The estimating means of the apparatus for estimating the exhaust gas temperature estimates, by an equation of state, a temperature increment of a gas which is adiabatically compressed under an adiabatic condition, by using the intake gas temperature, the intake gas pressure and the exhaust gas pressure. Further, in the apparatus for estimating the exhaust gas temperature, the intake gas flow acquiring means acquires the amount of the intake gas from the atmosphere. The intake gas flow acquiring means includes, for example, a conventional sensor for sensing the amount of the intake gas, which is generally used. Further, in the apparatus for estimating the exhaust gas temperature, the fuel flow acquiring means acquires the fuel flow which is supplied to the cylinders. The fuel flow acquiring means acquires, for example, the fuel flow, which is sprayed, according to the amount which is instructed by a controller of the internal combustion engine. Further, in the apparatus for estimating the exhaust gas temperature, the exhaust loss rate acquiring means acquires the exhaust loss rate of an amount of heat lost in the exhaust gas among an amount of the heat introduced into the cylinders. Moreover, the estimating means of the apparatus for estimating the exhaust gas temperature estimates the amount of heat introduced into the cylinders by calculating the amount of fuel flow which is supplied to the cylinders, estimates the amount of diluted gas flow by using the amount of intake gas and the amount of the fuel flow, and estimates the temperature increment, which is caused by the amount of diluted gas flow and the amount of heat which is lost through the exhaust gas, by using the amount of the heat introduced into the cylinders, the exhaust loss rate and the amount of diluted gas flow. Further, the estimating means of the apparatus for estimating the exhaust gas temperature adds two temperature increments and estimates the exhaust gas temperature in the exhaust manifold.

In the apparatus for estimating the exhaust gas temperature according to the aspect of the present invention, a map, which indicates the exhaust loss rate by using at least the number of revolutions of the engine and the amount of fuel flow as parameters, is prepared in advance, and the exhaust loss rate acquiring means preferably acquires the exhaust loss rate by using the map. As described above, in the apparatus for estimating the exhaust gas temperature, the exhaust loss rate may be simply acquired by previously preparing the map of the exhaust loss rate using the number of revolutions of the engine and the amount of fuel flow as the parameters.

In the apparatus for estimating the exhaust gas temperature of the internal combustion engine according to the present invention, if the internal combustion engine is equipped with an EGR, the apparatus is provided with an EGR rate acquiring means. The estimating means may estimate a temperature increment caused by the amount of heat which is obtained by dividing the amount of heat lost in the exhaust gas among the amount of heat introduced into the cylinders of the internal combustion engine by the amount of diluted gas flow of the exhaust gas in the exhaust manifold in consideration of the EGR rate acquired by the EGR rate acquiring means.

In the case where the internal combustion engine is equipped with the EGR, since some of the exhaust gas recirculates to an intake side, the EGR rate (a recirculation ratio of the exhaust gas) has an effect on the amount of the diluted gas flow. Therefore, in the apparatus for estimating the exhaust gas temperature, the EGR rate acquiring means acquires the EGR rate. The EGR rate acquiring means includes, for example, a calculation means using the amount of intake air or the amount of EGR gas flow which is detected by each flow sensor, or an estimating means using a well-known estimating method. The estimating means of the apparatus for estimating the exhaust gas temperature estimates the amount of diluted gas flow in consideration of the EGR rate, and estimates a temperature increment, which is caused by the amount of lost heat/diluted gas flow in the exhaust gas, by using the amount of the diluted gas flow.

Advantageous Effects of Invention

According to an aspect of the present invention, the temperature of the exhaust gas in the exhaust manifold is estimated from a temperature increment by an adiabatic compression in the internal combustion engine and a temperature increment by the amount of diluted gas flow/the amount of heat lost in the exhaust gas among the amount of heat introduced in the cylinder. Accordingly, it is possible to estimate the temperature of the exhaust gas with a high accuracy and a low processing load by using only general sensors installed in the internal combustion engine.

DESCRIPTION OF EMBODIMENTS

Hereinafter, an embodiment of an apparatus for estimating an exhaust gas temperature of an internal combustion engine according to an aspect of the present invention will be described with reference to the accompanying drawings.

In the embodiment, the apparatus for estimating an exhaust gas temperature of an internal combustion engine is applied to an ECU of an engine (internal combustion engine) mounted on a diesel vehicle. The engine according to the embodiment is equipped with a variable capacitance type turbocharger and an Exhaust Gas Recirculation (EGR) system of a High Pressure Loop (HPL). In the engine according to the embodiment, the ECU performs a well-known engine control, a variable capacitance control of a turbocharger, an EGR control, an exhaust gas purification control, a trouble diagnosis and the like, and simultaneously estimates an exhaust gas temperature for use in the control thereof. Meanwhile, in the present embodiment, only a process of estimating an exhaust gas temperature will be described without a description of each well-known control performed by the ECU.

Figure 1:
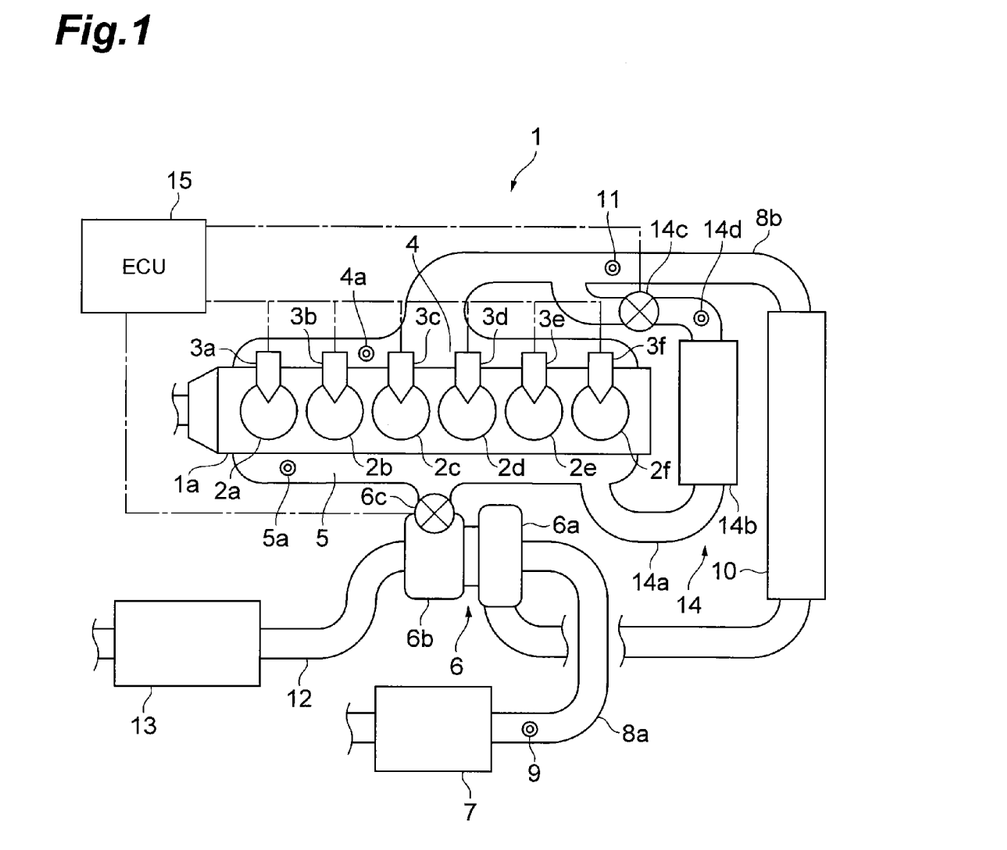
FIG. 1 is a schematic view illustrating a structure of an engine according to an embodiment of the present invention.
Figure 2:
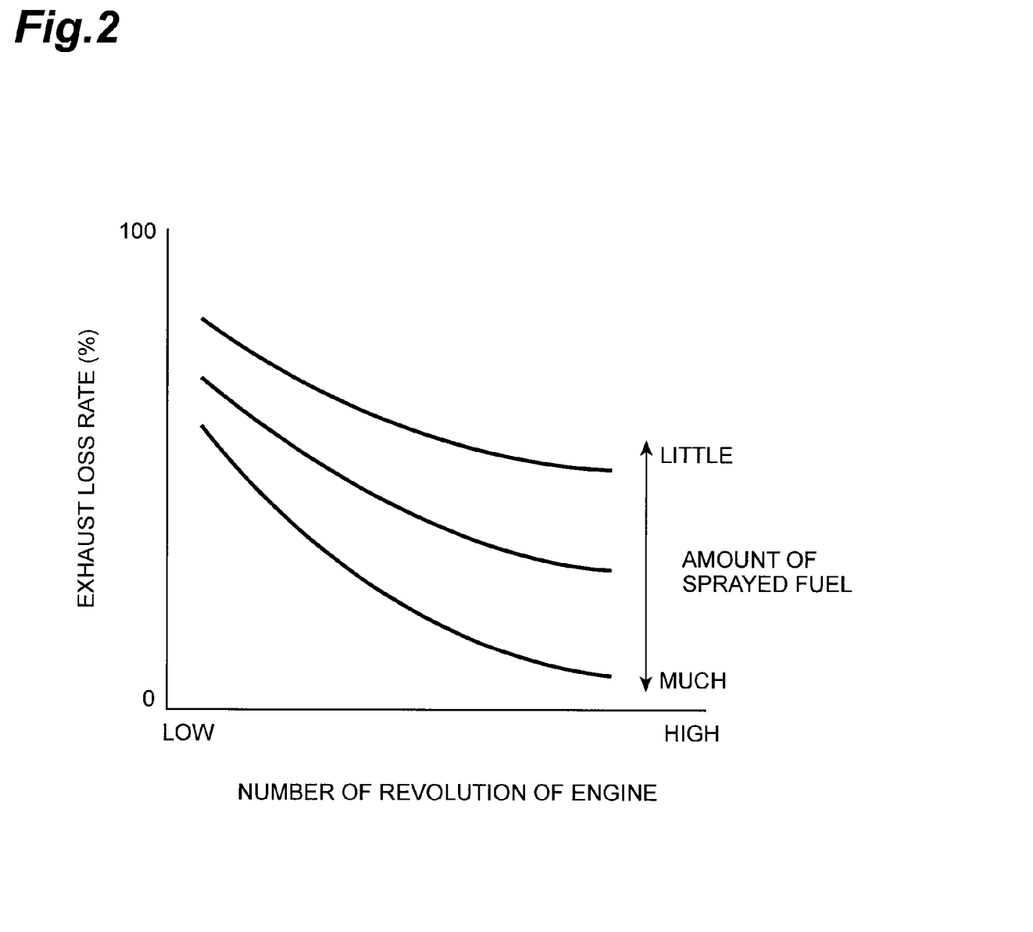
FIG. 2 is a graph illustrating an example of a map of an exhaust loss rate.

An engine 1 according to the embodiment will be described with reference to FIGS. 1 and 2. FIG. 1 is a schematic view illustrating a structure of an engine according to an embodiment of the present invention. FIG. 2 is a graph illustrating an example of a map of an exhaust loss rate.

In the engine 1 (especially, in an estimation of an exhaust gas temperature by the ECU 15), without using a temperature sensor, an exhaust gas temperature of an exhaust manifold is estimated using only typical sensors mounted on the engine. Especially, in the estimation of the exhaust gas temperature by the ECU 15, the exhaust gas temperature (hereinafter, referred to as "exhaust manifold temperature Tem") in the exhaust manifold is estimated by adding a temperature increment by an adiabatic compression until a gas introduced in an intake manifold is exhausted to the exhaust manifold, to a temperature increment by an amount of heat obtained by dividing an amount of heat lost through the exhaust gas among the amount of heat introduced into the cylinder by an amount of diluted gas flow of the exhaust gas.

The engine 1 is a six-cylinder diesel engine in which six cylinders 2a, 2b, 2c, 2d, 2e, and 2f are arranged in series in an engine body 1a. Each cylinder 2a, 2b, 2c, 2d, 2e, or 2f has an injector 3a, 3b, 3c, 3d, 3e, or 3f installed thereto respectively. The injectors 3a, 3b, 3c, 3d, 3e, and 3f spray fuel (diesel oil) into the cylinders 2a, 2b, 2c, 2d, 2e, and 2f, respectively. In the engine body 1a, the fuel is sprayed and combusted under a condition that a gas (air in atmosphere+EGR gas obtained through recirculation of the exhaust gas) has been adiabatically compressed by a piston (not shown) in each cylinder 2a, 2b, 2c, 2d, 2e, or 2f. This combustion generates a heat energy (heat quantity), a part of which is used for reciprocating of a piston and heating of a cooling water while the residual of which is lost through an exhaust gas.

An intake manifold 4 is connected to the engine body 1a (cylinders 2a, 2b, 2c, 2d, 2e and 2f). The intake manifold 4 distributes and supplies an intake gas (air+EGR gas) to each of the cylinders 2a, 2b, 2c, 2d, 2e, and 2f. The intake manifold 4 has an intake manifold temperature sensor 4a installed therein. The intake manifold temperature sensor 4a detects a temperature (hereinafter, referred to as "an intake manifold temperature Tim") of the intake gas within the intake manifold 4 and outputs the detected value to the ECU 15. Meanwhile, in the present embodiment, the intake manifold temperature sensor 4a corresponds to the intake gas temperature acquiring means described in the claims.

Further, an exhaust manifold 5 is connected to the engine body 1a (cylinders 2a, 2b, 2c, 2d, 2e and 2f). The exhaust manifold 5 merges the exhaust gases exhausted from the cylinders 2a, 2b, 2c, 2d, 2e and 2f and leads the merged exhaust gases into a turbine 6b of a turbocharger 6 or an EGR passage 14a of the EGR system. The exhaust manifold 5 has an exhaust manifold pressure sensor 5a installed therein. The exhaust manifold pressure sensor 5a detects a pressure (hereinafter, referred to as "an exhaust manifold pressure Pem") of the exhaust gas in the exhaust manifold 5 and outputs the detected value to the ECU 15. Further, in the present embodiment, the exhaust manifold pressure sensor 5a corresponds to the exhaust gas pressure acquiring means described in the claims.

The engine 1 is equipped with the variable capacitance type turbocharger 6. The turbocharger 6 includes a compressor 6a and a turbine 6b, and the compressor 6a and the turbine 6b rotate coaxially. In the turbocharger 6, the turbine 6b is rotated by the pressure of the exhaust gas lead from the exhaust manifold 5, and a compressor 6a, which rotates coaxially with the turbine 6b, compresses and supercharges air. The turbine 6b has a nozzle vane 6c installed therein, and the amount of the exhaust gas introduced into the turbine 6b is controlled by the opening degree of the nozzle vane 6c.

In the intake side, air is introduced from the atmosphere through an air cleaner 7 and is then compressed by the compressor 6a. An air flow sensor 9 is installed in an intake passage 8a between an air cleaner 7 and a compressor 6a. The air flow sensor 9 detects the amount of the air (hereinafter, referred to as "air flow Ga") introduced from the atmosphere and outputs the detected value to the ECU 15. The air compressed by the compressor 6a is cooled by an intercooler 10 and is then introduced into the intake manifold 4. A boost pressure sensor 11 is installed in the intake passage 8b between the intercooler 10 and the intake manifold 4. The boost pressure sensor 11 detects a boost pressure (a supercharging pressure by the turbocharger 6) and outputs the detected value to the ECU 15. The boost pressure corresponds to the pressure of the intake gas (hereinafter, referred to as "an intake manifold pressure Pim") in the intake manifold 4. In the present embodiment, the air flow sensor 9 corresponds to the intake gas flow acquiring means described in the claims and the boost pressure sensor 11 corresponds to the intake gas pressure acquiring means described in the claims.

In the exhaust side, an exhaust gas from the exhaust manifold 5 is quantitatively controlled by the nozzle vane 6c and is then introduced into the turbine 6b so as to rotate the turbine 6b. The exhaust gas discharged from the turbine 6b is introduced into an exhaust system (not shown) through an exhaust passage 12, is purified by the exhaust system, and is then discharged out of a vehicle through a muffler 13.

Further, the engine 1 is equipped with the EGR system 14. The EGR system 14 has an EGR passage 14a. The EGR passage 14a is a passage interconnecting the intake passage 8b and the exhaust manifold 5 and recycles the exhaust gas from the exhaust manifold 5 to the intake side as an EGR gas. An EGR cooler 14b is installed in the EGR passage 14a and cools the recycled exhaust gas. Further, an EGR valve 14c is installed in the EGR passage 14a and controls the recycled EGR gas flow. Further, an EGR gas flow sensor 14d is installed in the EGR passage 14a. The EGR gas flow sensor 14d detects the recycled EGR gas flow and outputs the detected value to the ECU 15.

The ECU 15 is an electronic control unit including a Central Processing Unit (CPU), a Read Only Memory (ROM), and a Random Access Memory (RAM) and generally controls the engine 1. The ECU 15 loads various programs stored in the ROM to the RAM and allows the CPU to execute the programs, so as to perform a process of estimating an exhaust gas temperature, as well as well-known processes, including an engine body control (for example, a fuel injection control of injectors 3a, 3b, 3c, 3d, 3e and 30, a variable capacitance control of a turbocharger (for example, an opening degree control of the nozzle vane 6c), an EGR control (for example, an opening degree control of the EGR valve 14c), an exhaust gas purification control, and a breakdown diagnosis. In the embodiment of the present invention, with respect to the processes executed by the ECU 15, only the process of estimating the exhaust gas temperature will be described in detail.

Now, a method of estimating the exhaust gas temperature according to the embodiment of the present invention will be described, before the estimation of the exhaust gas temperature is described in detail. In the embodiment of the present invention, the exhaust manifold temperature Tem is defined as a temperature obtained by adding a temperature increment $\Delta Tf$ by an amount of heat, which is obtained by dividing an amount of heat Qexf lost in the exhaust gas among the amount of heat Qf introduced into the cylinders 2a, 2b, 2c, 2d, 2e and 2f by an exhaust gas flow (a diluted gas flow) Gexh of the exhaust manifold 5, to a temperature Tim' of the gas, which has risen from the intake manifold temperature Tim of the gas introduced in the intake manifold 4 through the adiabatic compression of the gas until the gas is discharged to the exhaust manifold 5.

First, in the case where an input temperature is put as T, an output temperature is put as T', an input pressure is put as P, and an output pressure is put as P', a state equation of the adiabatic change is defined by Equation (1). In Equation (1), k indicates a specific heat ratio and is equal to a constant-pressure specific heat Cp/a constant-volume specific heat Cv. The temperature Tim' of the gas after the adiabatic compression of the gas introduced in the intake manifold 4 according to Equation (1) can be calculated by Equation (2) using the intake manifold temperature Tim, the intake manifold pressure Pim, and the exhaust manifold pressure Pem. The intake manifold temperature Tim, the intake manifold pressure Pim, and the exhaust manifold pressure Pem can be obtained by the intake manifold temperature sensor 4a, the boost pressure sensor 11, the exhaust manifold pressure sensor 5a, respectively. However, the exhaust manifold pressure Pem may be obtained by a well-known estimation using the boost pressure detected by the boost pressure sensor 11 and the opening degree of the nozzle vane 6c of the turbocharger 6, instead of using the pressure sensor.

$$\frac{T'}{T} = \left(\frac{P'}{P}\right)^{\left(\frac{\kappa-1}{\kappa}\right)} \quad (1)$$

$$Tim' = Tim \times \left(\frac{Pem}{pim}\right)^{\left(\frac{\kappa-1}{\kappa}\right)} \quad (2)$$

Next, the amount of heat Qf input to the cylinders 2a, 2b, 2c, 2d, 2e and 2f can be calculated by Equation (3) using a fuel flow Gf sprayed by the injectors 3a, 3b, 3c, 3d, 3e and 3f into the cylinders 2a, 2b, 2c, 2d, 2e and 2f and a lower heating value Kf (a constant) of the diesel oil. The fuel flow Gf can be obtained from the amount of sprayed fuel which is indicated by the ECU 15, by controlling the amount of fuel, which is indicated by the ECU 15 to be sprayed by each injector 3a, 3b, 3c, 3d, 3e or 3f, to sufficiently coincide with the actual amount of the sprayed fuel. Further, the exhaust gas flow (the diluted gas flow) Gexh of the exhaust manifold 5 can be calculated by Equation (4) using the air flow Ga, which is introduced from atmosphere, the EGR rate Er, and the fuel flow Gf. The air flow Ga can be obtained by an air flow sensor 9. The EGR rate Er may be calculated using the air flow Ga detected by the air flow sensor 9 and the EGR gas flow detected by the EGR gas flow sensor 14d, or may be obtained by a well-known estimation using the boost pressure detected by the boost pressure sensor 11, the intake manifold temperature detected by the intake manifold temperature sensor 4a, and the like. In the embodiment of the present invention, the EGR rate Er has a value of 0~1. On the other hand, in the case of a vehicle having no EGR system, the EGR rate is 0.

$$Qf = Gf \times Kf \quad (3)$$

$$Gexh = \frac{Ga}{(1 - Er/100)} + Gf \quad (4)$$

Further, the amount of heat Qexf, which is lost in the exhaust gas, among the amount of heat Qf introduced into the cylinders can be calculated by Equation (5) using the diluted gas flow Gexh, a constant-pressure specific heat Cp (constant), and a temperature increment $\Delta Tf$ of the exhaust gas by the amount of heat introduced into the cylinders. Equation (6) is established by modifying Equation (5) to obtain the temperature increment $\Delta Tf$. Further, an exhaust loss rate heat $\eta$ exh of the amount of heat Qexf lost through the exhaust gas from the amount of heat Qf introduced into the cylinder can be calculated by Equation (7) using the amount of heat Qexf lost through the exhaust gas and the amount of heat Qf introduced into the cylinders. Equation (8) is established by modifying Equation (7) to obtain the amount of heat Qexf lost in the exhaust gas.

$$Qexh = Gexh \times Cp \times \Delta Tf \quad (5)$$

$$\Delta Tf = \frac{Qexh}{Gexh \times Cp} \quad (6)$$

$$\eta exh = \frac{Qexh}{Qf} \times 100 \quad (7)$$

$$Qexh = \frac{\eta exh \times Qf}{100} \quad (8)$$

If Equation (8) is substituted for Equation (6), Equation (9) is established to obtain the temperature increment ΔTf. Further, if Equations (3) and (4) are substituted for Equation (9), Equation (10) is established as an equation to obtain the temperature increment ΔTf. In Equation (10), the exhaust loss rate heat η exh can be obtained from an exhaust loss rate heat map prepared in advance. The exhaust loss rate heat map is held in the ROM of the ECU 15, and the exhaust loss rate heat η exh can be obtained from the number of revolutions or the amount of sprayed fuel by searching the exhaust loss rate heat map.

$$\Delta Tf = \frac{\eta exh \times Qf}{100 \times Gexh \times Cp} \quad (9)$$

$$\Delta Tf = \frac{Gf \times Kf \times \eta exh}{100 \times (Ga/(1 - Er/100) + Gf) \times Cp} \quad (10)$$

Now, the exhaust loss rate heat map will be described. In advance, normal data in an engine use region of a real engine is acquired by using an engine in which a temperature of an exhaust gas can be actually measured at a high accuracy. Then, by using the normal data, the exhaust loss rate is calculated by Equation (7). Then, a map in which the exhaust loss rate can be searched is made by changing the number of revolutions or the amount of sprayed fuel (or an indicated amount of fuel) of the engine, and by using the number of revolutions of the engine or the amount of sprayed fuel (corresponding to the fuel flow) as parameters. FIG. 2 shows an example of a map in which the number of revolutions of the engine and the amount of sprayed fuel are used as parameters. The higher the number of revolutions of the engine is, the lower the exhaust loss rate is. Also, the more the amount of sprayed fuel is, the lower the exhaust loss rate is. On the other hand, the map is made and maintained in every combustion mode (for example, a general mode, a temperature rising mode, a reducing agent adding mode) of the engine.

The exhaust manifold temperature Tem corresponds to a temperature obtained by adding the temperature increment ΔTf caused by the amount of heat introduced into the cylinders to the temperature Tim' after the gas introduced in the intake manifold 4 is adiabatically compressed, as noted from Equation (11). Accordingly, if the Equations (2) and (10) are substituted for Equation (11), Equation (12) is established as an equation for obtaining the exhaust manifold temperature. By Equation (12), the exhaust manifold temperature Tem can be estimated using the intake manifold temperature Tim, the intake manifold pressure Pim, the exhaust manifold pressure Pem, the fuel flow Gf, the air flow Ga, the EGR rate Er, and the exhaust loss rate heat η exh. On the other hand, since an instantaneous value of the exhaust manifold temperature Tem can be obtained by Equation (12), a value obtained by annealing the exhaust manifold temperature Tem by using a first delay compensation may be used according to a purpose of use.

$$Tem = Tim' + \Delta Tf \quad (11)$$

$$Tem = Tim \times \left(\frac{Pem}{Pim}\right)^{\left(\frac{\kappa-1}{\kappa}\right)} + \frac{Gf \times Kf \times \eta exh}{100 \times (Ga/(1 - Er/100) + Gf) \times Cp} \quad (12)$$

On the other hand, Equation (12) can be applied to an engine equipped with no EGR system by setting the EGR rate Er in Equation (12) to zero. Further, since Equation (12) has no parameter for the turbocharger or variable capacitance type/fixed capacitive type of the turbocharger, Equation (12) can be applied to the engine, regardless of whether the engine has the turbocharger or not, a single stage supercharge or multiple stage supercharge, and variable capacitive type or fixed capacitive type. Further, by changing the constants of Kf, k, and Cp in Equation (12), Equation (12) may be applied to various gasoline engines as well as various diesel engines.

Now, a process of estimating the exhaust gas temperature by the ECU 15 will be described. The ECU 15 detects the intake manifold temperature Tim, the intake manifold pressure Pim, the exhaust manifold pressure Pem, and the air flow Ga from the intake manifold temperature sensor 4a, the boost pressure sensor 11, the exhaust manifold pressure sensor 5a, and the air flow sensor 9 at a predetermined time interval, respectively. Further, the ECU 15 acquires the air flow Ga and the EGR gas flow from the air flow sensor 9 and the EGR gas flow sensor 14d at the predetermined time interval and calculates the EGR rate Er by using the air flow Ga and the EGR gas flow. In the present embodiment, the processing in the air flow sensor 9, the EGR gas flow sensor 14d and the ECU 15 corresponds to the EGR rate acquiring means described in the claims.

The ECU 15 performs the well-known engine control with a predetermined time interval, obtains the amount of fuel (indicated quantity) sprayed into the cylinders 2a, 2b, 2c, 2d, 2e and 2f, and acquires the fuel flow Gf from the amount of sprayed fuel (indicated quantity). Further, the ECU 15 selects an exhaust loss rate map from the exhaust loss rate maps corresponding to respective combustion modes previously held in the ROM, according to a current combustion mode of the engine 1. Moreover, the ECU 15 searches for the selected exhaust loss rate map by using the number of revolutions of the engine, which is acquired from the sensor (not shown) for sensing the number of revolutions of the engine with a predetermined time interval, and the fuel flow Gf (the amount of sprayed fuel) of the engine, and acquires the exhaust loss rate heat η exh. In the present embodiment, the processing of the ECU 15 corresponds to the fuel flow acquiring means and the exhaust loss rate acquiring means, which are described in the claims.

Furthermore, the ECU 15 calculates the exhaust manifold temperature Tem (instantaneous value) by Equation (12) using the intake manifold temperature Tim, the intake manifold pressure Pim, the exhaust manifold pressure Pem, the fuel flow Gf, the air flow Ga, the EGR rate Er and the exhaust loss rate heat η exh, which are detected at a predetermined time interval, and the lower heating value Kf, the constant-pressure specific heat Cp and the specific heat ratio k of diesel fuel, which are previously stored in the ROM. The calculated exhaust manifold temperature Tem is memorized in the RAM of the ECU 15 in the chronological order for a predetermined time. Further, the ECU 15 performs a first delaying compensation by using the exhaust manifold temperature (instantaneous value) in time series according to a necessity, and calculates an annealing value of the exhaust manifold temperature Tem. The ECU 15 uses the estimated exhaust manifold temperature Tem (instantaneous value or annealing value) to perform a control of an engine body, a control of a variable capacitance of the turbocharger, a control of the EGR, a control of purging the exhaust gas and a diagnostic of defect. On the other hand, in the present embodiment, the processing in the ECU 15 corresponds to the estimating means described in the claims.

Figure 3:
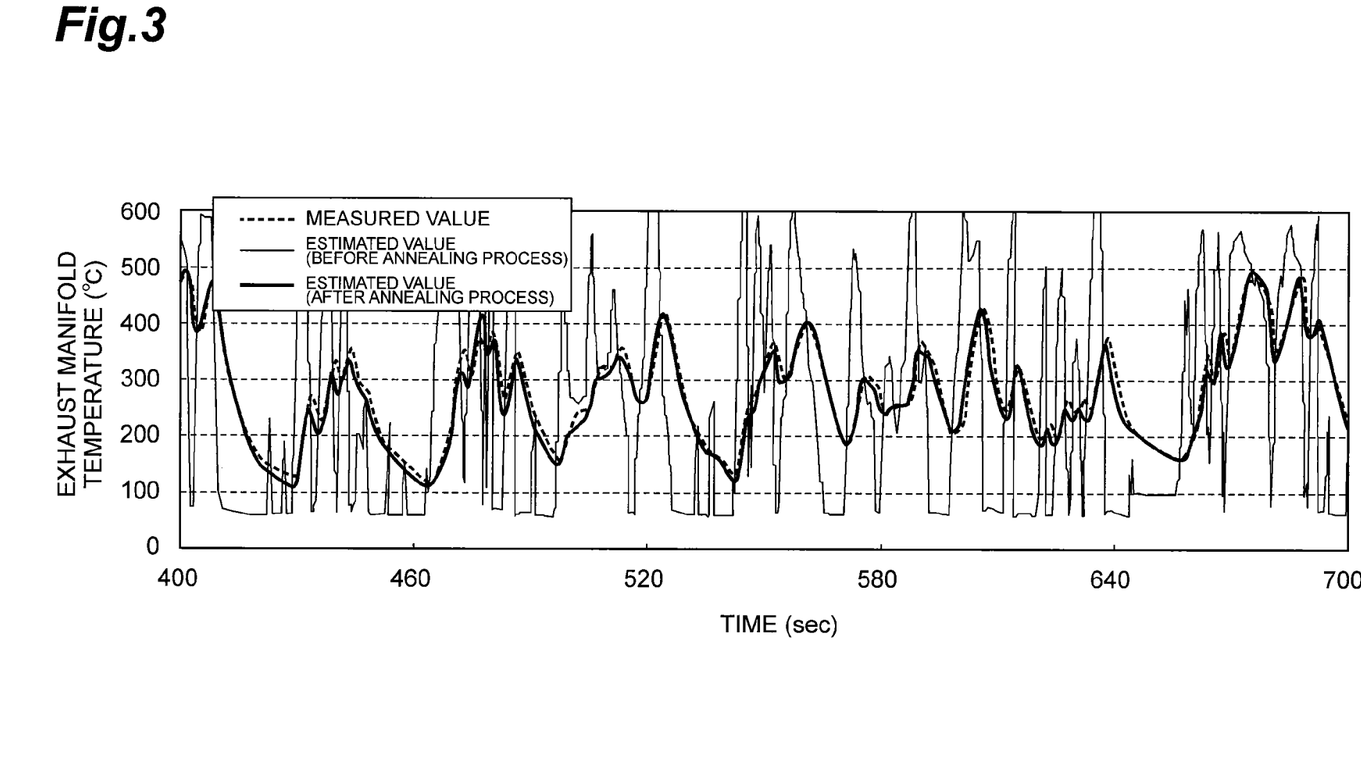
FIG. 3 is a graph illustrating an example of an estimation result of an exhaust gas temperature in a transient operation of the internal combustion engine according to the embodiment of the present invention.

FIG. 3 shows an example of a result of an estimation of the exhaust gas temperature (exhaust manifold temperature) in a transient operation, which is obtained through a test carried out in an exhaust gas test mode of a World Harmonized Transient Cycle (WHTC) by using the engine 1. In FIG. 3, the exhaust manifold temperature (instantaneous value: before an annealing process), which is estimated by a process of estimating the exhaust gas temperature, is depicted by a solid line (a narrow line), the annealed exhaust manifold temperature (annealing value: after the annealing process), which is obtained by annealing the estimated exhaust manifold temperature (instantaneous value), is shown by a solid line (a thick line), and the actually measured exhaust manifold temperature is indicated by a dotted line. In comparison between the estimated exhaust manifold temperature (annealing value) and the actually measured exhaust manifold temperature, it is noted that an estimated value very close to the actually measured value is obtained. In this example, there was an error of a maximum of ±30° C.

In this engine 1 (especially, in the process of estimating the exhaust gas temperature by the ECU 15), the exhaust manifold temperature is estimated from the temperature increment by the adiabatic compression in the engine 1 and the temperature increment by the amount of lost heat/the diluted gas flow in the exhaust gas among the amount of the heat introduced into the cylinders (using Equation (12)). Therefore, the exhaust manifold temperature (the exhaust gas temperature) can be estimated with a high accuracy and a low processing load, by using only a typical sensor, which is reliable and conventionally installed in the engine, without installing an exhaust manifold temperature sensor. The estimated exhaust manifold temperature is very accurate even in a transient operational state as well as in a normal operational state. Further, with the engine 1, it is possible to simply acquire the exhaust loss rate by preparing in advance an exhaust loss rate map in which the number of revolutions and the amount of sprayed fuel of the engine are used as parameters.

In other words, in the case of an engine equipped with a turbocharger, the exhaust manifold temperature may be easily changed by the adiabatic compression (the larger the difference between the exhaust manifold pressure and the intake manifold pressure by the turbocharger, the easier the change), and an error may easily occur in the estimation of the exhaust manifold temperature. However, since the temperature increment of the adiabatic compression is taken into consideration in the process of estimating the exhaust gas temperature by the ECU 15, the estimation has a high accuracy even in the case of an engine equipped with a turbocharger. Further, in the case of an engine equipped with an EGR system, since the diluted gas flow increases, an error may easily occur in the estimation of the exhaust manifold temperature. However, since the diluted gas flow (especially, EGR rate) is taken into consideration in the temperature increment of the exhaust gas caused by the amount of heat introduced into the cylinder in the process of estimating the exhaust gas temperature by the ECU 15, the estimation has a high accuracy even in the case of an engine equipped with an EGR system.

Further, in the case of an engine equipped with a sensor for detecting the exhaust manifold temperature, it is possible to diagnose a defect of the sensor by using the estimated exhaust manifold temperature. Further, the exhaust manifold temperature is very important for an exhaust gas purification control as well as for the engine control (including a variable capacitance control of a turbocharger and an EGR control).

The above description discusses an embodiment according to one aspect of the present invention. However, the present invention is not limited to the embodiment but may be implemented in various forms.

For example, in the present embodiment, an apparatus for estimating an exhaust gas temperature is embedded as one function of the ECU of the engine. However, the exhaust temperature estimating apparatus may be configured in another form, for example, the exhaust temperature estimating apparatus may be embedded in another ECU or may be configured as a single independent unit.

Further, in the above description of the embodiment of the present invention, the present invention is applied to a diesel internal combustion engine equipped with a variable capacitance type turbocharger and an EGR system. However, the present invention may be applied to other internal combustion engines, such as a gasoline engine, may be applied to an engine equipped with no turbocharger, and may be applied to an engine equipped with no EGR system. In regard to the turbocharger, the present invention may be applied to even a fixed capacitance type turbocharger or a multistage supercharge type turbocharger. In regard to the EGR system, the present invention may be applied to even a Low Pressure Loop (LPL) EGR system.

Further, in the embodiment of the present invention, it is described that the exhaust loss rate is acquired by using the maps. However, the exhaust loss rate may be acquired according to another method. For example, the exhaust loss rate may be calculated by using a previously prepared equation in which the number of revolutions of the engine or the amount of the sprayed fuel is used as a parameter.

Furthermore, in the embodiment of the present invention, Equation (12) is established in order to estimate the exhaust manifold temperature by using the temperature increment caused by the adiabatic compression and the temperature increment caused by the amount of lost heat/diluted gas flow in the exhaust gas among the amount of heat introduced into the cylinders, and the exhaust manifold temperature is then estimated by using Equation (12). However, another estimation equation other than Equation (12) may be established, and the exhaust manifold temperature may be estimated according to another method using a map, etc.

INDUSTRIAL APPLICABILITY

According to an aspect of the present invention, an exhaust gas temperature in an exhaust manifold can be estimated by using a temperature increment caused by an adiabatic compression in an internal combustion engine and a temperature increment caused by an amount of lost heat and a diluted gas flow in the exhaust gas among an amount of heat introduced into cylinders. Therefore, the present invention can be used for an exhaust gas temperature estimating apparatus, which can estimate an exhaust gas temperature with a high accuracy and a low processing load by using only a typical sensor usually installed in an internal combustion engine.

REFERENCE SIGNS LIST

1: engine
1a: engine body
2a, 2b, 2c, 2d, 2e, 2f: cylinder
3a, 3b, 3c, 3d, 3e, 3f: injector
4: intake manifold
4a: intake manifold temperature sensor
5: exhaust manifold
5a: exhaust manifold pressure sensor
6: turbocharger
6a: compressor
6b: turbine
6c: nozzle vane
7: air cleaner
8a, 8b: intake passage 9: air flow sensor
10: intercooler
11: boost pressure sensor
12: exhaust passage
13: muffler
14: EGR system
14a: EGR passage
14b: EGR cooler
14c: EGR valve
14d: EGR gas flow sensor
15: ECU

The invention claimed is:

1. An apparatus for estimating an exhaust gas temperature in an exhaust manifold of an internal combustion engine, the apparatus comprising:
    an intake gas temperature acquiring unit that acquires an intake gas temperature in the intake manifold;
    an intake gas pressure acquiring unit that acquires an intake gas pressure in the intake manifold;
    an exhaust gas pressure acquiring unit that acquires an exhaust gas pressure in the exhaust manifold; and
    an estimating unit that estimates the exhaust gas temperature, based on a temperature increment caused by an adiabatic compression until a gas introduced into an intake manifold of the internal combustion engine is exhausted to the exhaust manifold, by using the intake gas temperature, the intake gas, and the exhaust gas pressure, and a temperature increment caused by an amount of heat obtained by dividing an amount of heat lost in an exhaust gas among an amount of heat introduced into cylinders of the internal combustion engine by a diluted gas flow of the exhaust gas in the exhaust manifold.

2. The apparatus as claimed in claim 1, further comprising:
    an intake gas flow acquiring unit that acquires an intake gas flow which flows from the atmosphere;
    a fuel flow acquiring unit that acquires the fuel flow supplied into the cylinders; and
    an exhaust loss rate acquiring unit that acquires an exhaust loss rate,
    wherein the estimating unit simultaneously estimates the temperature increment, which is caused by the amount of heat obtained by dividing the amount of heat lost in the exhaust gas among the amount of heat introduced into the cylinders of the internal combustion engine by the diluted gas flow of the exhaust gas in the exhaust manifold by using the intake gas flow acquired by the intake gas flow acquiring unit, the fuel flow acquired by the fuel flow acquiring unit, and the exhaust loss rate acquired by the exhaust loss rate acquiring unit.

3. The apparatus as claimed in claim 2, wherein a map, which indicates the exhaust loss rate by using at least the number of revolutions of the engine and the fuel flow as parameters, is prepared in advance, and the exhaust loss rate acquiring unit acquires the exhaust loss rate by using the map.

4. The apparatus as claimed in claim 3, further comprising:
    an EGR rate acquiring unit that acquires an EGR rate when the internal combustion engine is equipped with an EGR,
    wherein the estimating unit estimates the temperature increment caused by an amount of heat which is obtained by dividing the amount of heat lost in the exhaust gas among the amount of heat introduced into the cylinder of the internal combustion engine by the amount of the diluted gas flow of the exhaust gas in the exhaust manifold in consideration of the EGR rate acquired by the EGR rate acquiring unit.

5. The apparatus as claimed in claim 2, further comprising:
    an EGR rate acquiring unit that acquires an EGR rate when the internal combustion engine is equipped with an EGR,
    wherein the estimating unit estimates the temperature increment caused by an amount of heat which is obtained by dividing the amount of heat lost in the exhaust gas among the amount of heat introduced into the cylinder of the internal combustion engine by the amount of the diluted gas flow of the exhaust gas in the exhaust manifold in consideration of the EGR rate acquired by the EGR rate acquiring unit.

* * * * *